Patented June 5, 1923.

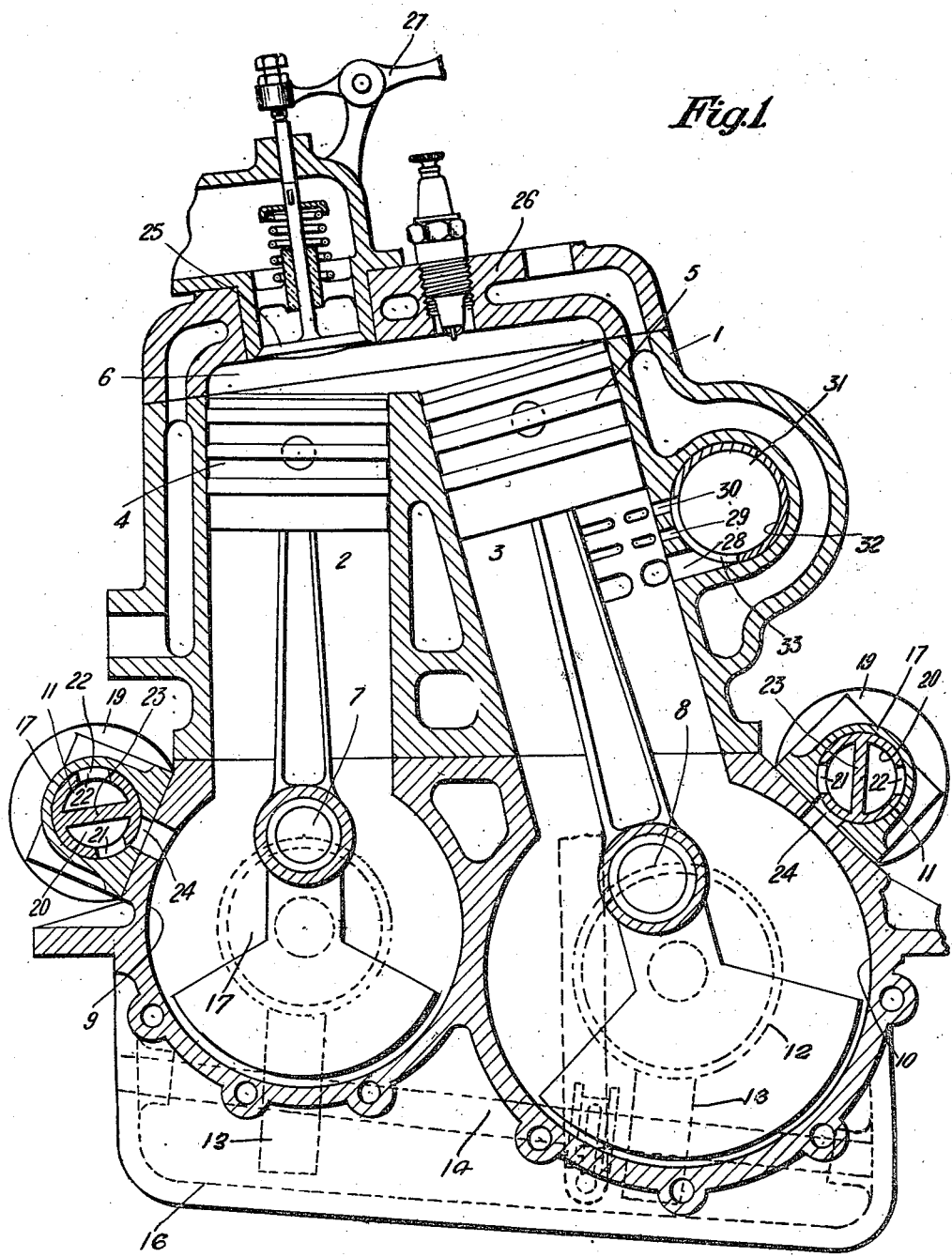

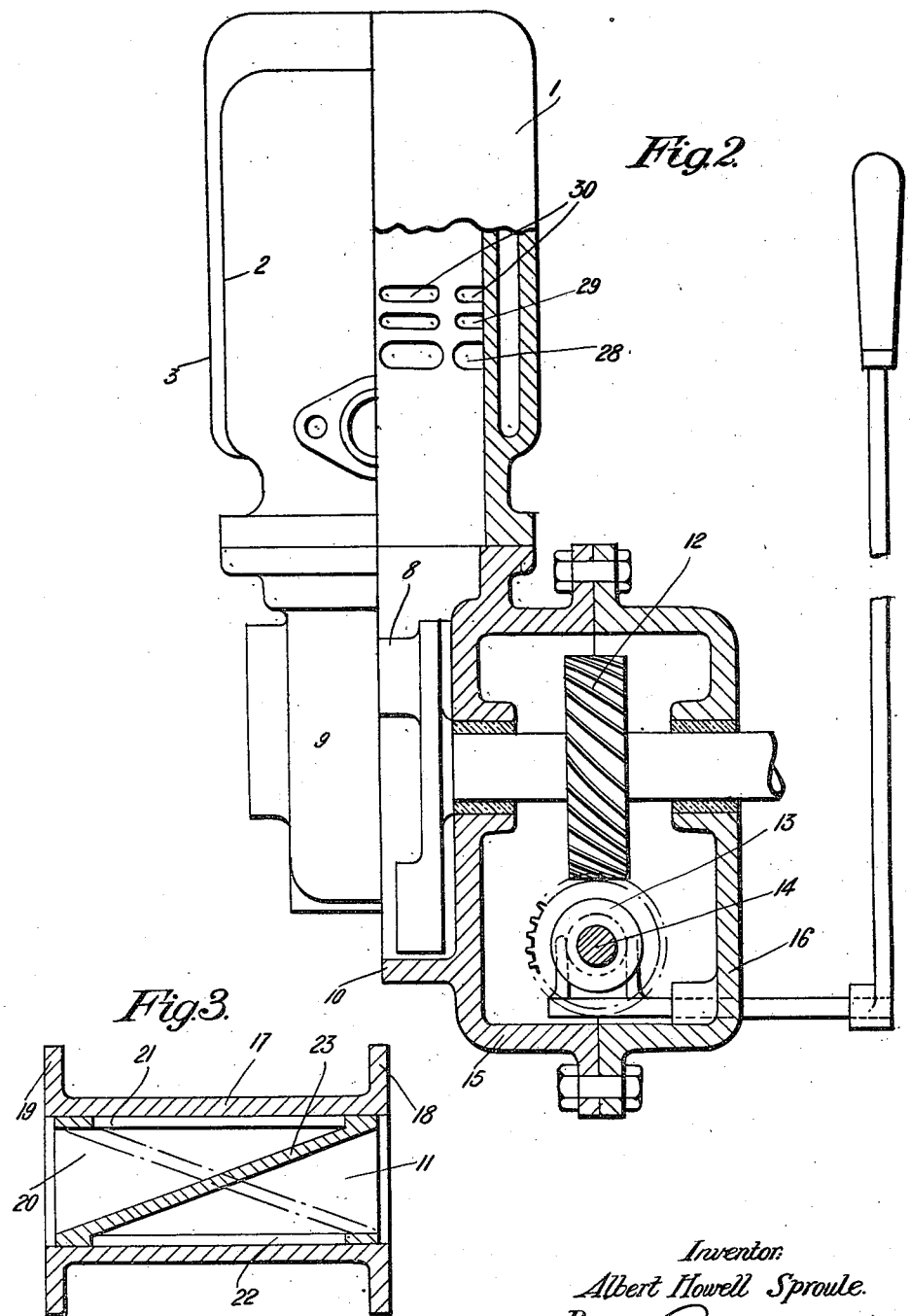

1,457,322

UNITED STATES PATENT OFFICE.

ALBERT HOWELL SPROULE, OF LONDON, ENGLAND.

INTERNAL-COMBUSTION ENGINE.

Application filed October 5, 1920. Serial No. 414,851.

*To all whom it may concern:*

Be it known that I, ALBERT HOWELL SPROULE, subject of the King of Great Britain and Ireland, residing at 1 Morpeth Terrace, London, in the county of London, England, have invented certain new and useful Improvements in Internal-Combustion Engines, of which the following is a specification.

My invention relates to an improved arrangement and construction of internal combustion engine, the object of which is to provide an engine which will be more flexible than existing types, to increase the efficiency particularly at light loads and to enable the engine to operate at considerably over its normal load capacity, and also to enable the engine to be reversed.

According to my invention I employ a pair of cylinders connected together so as to have a common combustion space. In these cylinders are provided pistons, each connected to a separate crank, the two cranks being geared together in the ratio of two to one so that one piston will make two complete strokes in the same period of time as the other is making four complete strokes. In this manner one piston will make two strokes to each cycle of operations, whilst the other piston will make four strokes to each cycle.

The two cranks are so geared together that the relative setting of the two pistons to each other may be varied, so that one of them may be advanced in front of the other to any desired extent to vary the volume of the charge while still keeping a practically constant compression pressure, and an increased expansion ratio at light loads with increased efficiency and only a slightly reduced expansion ratio and efficiency at overloads.

If the two stroke piston is advanced "negatively" relatively to the four stroke piston, the engine may be made to reverse and will run in the opposite direction. When the setting of the pistons relatively to each other is such that both pistons reach the top of their stroke at substantially the same time, a much reduced charge may be delivered than is normally provided in other engines employing a similar degree of normal compression, and owing to the expansion volume being much greater relatively to the compression space, the exhaust losses will be decreased and a higher efficiency obtained.

The weight of the charge will depend upon the volume of "clear" compression space allowed in the design and may be varied over a large range to suit any particular case, generally a reduction of this space will result in increased efficiency at light loads and decrease the maximum power available, an increase of this space will have the opposite effect. In this manner it will be possible by providing a detachable head adapted to be interchanged with another head so as to vary the combustion space, one engine may be adapted for use under varying conditions.

The two cylinders may be set parallel to each other or inclined at a suitable angle and provided with a common combustion space, or they may be connected together in line end to end, the two pistons being opposed to each other and the combustion space formed between them or the cylinders may be otherwise disposed and the two combustion spaces connected by a suitable channel or connection, or a single cylinder and combustion head may be used with two pistons working concentrically.

The gearing between the two cranks is so arranged that the relative angular position may be varied at will and this may be suitably done by means of helical gearing, one or both wheels being made to slide axially on its shaft, so that owing to the inclination of the teeth the relative angular position of the two cranks will be changed, or a series or train of wheels having helical or inclined teeth may be employed, one or more of which may be adapted to slide axially for the purpose of altering the relative angular position of the two cranks.

Owing to the reciprocation of the two pistons in their respective cylinders, the volume between them and the cylinder head will pass through a cycle of maxima and minima values so as to effect the admission, compression, expansion and exhaust of the combustible gases.

Any system of automatic valves may be employed, or valves mechanically operated from suitable timing gear, driven by or synchronized with one or other of the crank shafts. In order to ensure the sufficiency of charge under all conditions, forced induction may be employed, the combustible mixture or air being compressed in the crank case, or in a separate compressor.

The gases so compressed either in the crank case or the separate compressor may be delivered direct to the working cylinder or cylinders, or a suitable reservoir or receiver may be interposed between them. Any number of cylinder units may be built together to form an engine.

As a modification the cranks may be geared together at any other suitable ratio instead of the ratio of two to one, previously described.

In order that my invention may be readily understood reference is made to the accompanying drawings, in which:—

Fig. 1 is a vertical section.

Fig. 2 is a part sectional end view of a construction of internal combustion engine embodying my invention, and;

Fig. 3 is a detail.

Referring to Figures 1 and 2, the cylinder unit 1 is provided with two separate cylinders 2 and 3 in each of which is a working piston 4 and 5 respectively, and the two cylinders 2 and 3 are connected together at their upper ends by the common combustion space 6. The pistons 4 and 5 are each connected by a connecting rod to their respective cranks 7 and 8, arranged in a separate crank chamber 9 and 10 respectively. These crank chambers 9 and 10 are separated from each other and are each provided with a combined inlet and outlet valve 11, through which air or combustible mixture may be drawn into each of the crank cases and compressed, and subsequently transferred either directly to the combustion space 6 or to a suitable reservoir or receiver.

The two cranks 7 and 8 are interconnected by means of helical gears 12 upon their shafts, which gear with helical wheels 13 upon a transverse shaft 14 situated in the extension 15 of the crank case and provided with a detachable cover 16. The pitch angle of the helical gears 12 and 13 and their direction of inclination is such that the two cranks 7 and 8 are geared together in the ratio of two to one and so that the resultant thrust from the two shafts will be substantially neutralized. In this manner the crank 7 will rotate twice for each rotation of the crank 8 so that the piston 4 working in the cylinder 2 will make four strokes to each cycle, whilst the piston 5 in the cylinder 3 will make two strokes for its cycle and during the same time.

The shaft 14 carrying the helical gears 13 which gear with the wheels 12 upon the shafts of the two cranks 7 and 8 is arranged to be moved endwise by means of a fork or other suitable actuating mechanism under the control of the driver or attendant. Since the two wheels 13 have their teeth inclined at opposite angles, the thrust upon the shaft 14 may be substantially balanced, enabling the shaft to be readily moved without undue force and at the same time altering the relative angular position of the two cranks 7 and 8 so that their respective pistons 4 and 5 may be set to reach the top of their working strokes together or they may be advanced or retarded relatively to each other so as to affect the volume of the combustion space and degree of compression of the charge for varying conditions and loads, or the compression may be maintained substantially constant for a variety of volumes of charge so as to maintain the working efficiency of the engine at light loads.

Each crank case 9 and 10 is provided with a combined inlet and transfer valve 11, shown in detail in Figure 3, and through which the charge for the engine is drawn into both crank chambers 9 and 10 and compressed therein and subsequently transferred to a receiver to be supplied to the engine as required. At each cycle of operations one charge will be drawn into the crank chamber 10 and compressed and transferred to the receiver, whilst two charges will be drawn into and compressed in the crank chamber 9 and also transferred to the same receiver. Both crank chambers 9 and 10 are designed so that the charge in each will be compressed to substantially the same pressure.

The inlet and transfer valve 11 is shown in detail in Figure 3 and comprises a cylindrical casing 17 having a flange 18 at one end and a flange 19 at its other end. Within this cylindrical casing 17 is provided a tubular valve 20 having ports 21 and 22 upon opposite sides thereof, and an inclined or diagonal division 23 extending along its length from end to end so as to separate the two ports 21 and 22 from each other. In the cylindrical casing 17 is provided a port 24 communicating with a passage in the crank casing leading to the crank chambers 9 and 10.

To the flange 18 at one end of the cylindrical casing 17 is connected a carburetter or induction pipe for the supply of air or combustible mixture, whilst to the flange 19 at the other end is connected the transfer pipe leading to the receiver for the air or combustible mixture to be supplied to the combustion space 6 as required by the engine. The tubular valve 20 is driven by any suitable gearing in synchronism with the cranks 7 and 8 and may be so inter-connected with the gears 12 and 13 or the shaft 14 and a mechanism for controlling their relative positions, that the positions of this valve 20 may be similarly controlled at the same time. For this purpose the slots 21 and 22 may be inclined or spiral in shape so that if the valve 20 be slidden endwise in its casing 17, the timing of the valve will be altered so that its opening and closing will occur earlier or later as desired.

The mixture compressed in the crank cases 9 and 10 and transferred to the receiver is supplied therefrom to the combustion space 6 through the mechanically operated inlet valve 25, situated on the combustion head 26 on the engine and adapted to be actuated at the required period through suitable push rod and tappet gear 27 by suitable cam or other mechanism on or driven from the lay shaft 14, or from the shaft on the crank 8.

In the walls of the cylinder 3 are provided a series of exhaust ports 28, 29 and 30, leading to an exhaust passage 31 in the cylinder wall. These exhaust ports 28, 29 and 30 are arranged in rows and are adapted to be uncovered by the piston 5 as it reaches the lower end of its stroke. The lowermost row of ports 28 are the main exhaust ports and are larger than the two sets of ports 29 and 30 situated above them and which are supplementary ports which may be put out of action by means of the rotatable control sleeve 32, situated in the exhaust passage 31 and provided with an opening 33 which may be moved to uncover all the ports simultaneously, or so as to cut off the upper ones 29 and 30 when desired.

The operation of the engine is as follows:—

In the position shown in Figure 1, the two pistons 4 and 5 are in phase so that they both reach the top of the compression stroke simultaneously. In this position the effective clearance or combustion space above the two pistons will be a minimum and this position of the pistons is that suitable for running under light loads with high efficiency and small consumption of fuel. The charge is drawn into the crank chambers 9 and 10 respectively and transferred through the valve 11 to a receiver or reservoir in which a substantially constant or controllable pressure of charge is maintained ready to be supplied to the combustion space 6 through the inlet valve 25 when this is opened by the valve gear 27. The downward movements of the pistons 4 and 5 draw the charge through this valve 25 and it is subsequently compressed in the combustion space 6 by the upward movement of both pistons. The charge is then fired in the usual manner so that its expansion will exert a thrust on both the pistons 4 and 5 so as to rotate their respective cranks 7 and 8. Owing to the fact that both pistons move outwardly at the same time, a larger ratio of expansion may be obtained so that a low terminal exhaust pressure results, thus securing a maximum of power for the fuel expended and maintaining a relatively high efficiency at light loads.

In order to run the engine satisfactorily for heavy or over-loads, the relative setting of the two cranks 7 and 8 is altered by moving the shafts 14 carrying the gears 13 so as to advance the crank 8 relatively to the crank 7. By this means the pistons 4 and 5 will reach the upper ends of their compression strokes at different periods, thus altering the effective volume of the combustion space to maintain substantially the same compression, with a largely increased volume of charge admitted. In this manner a much greater volume of charge may be compressed and ignited under the most suitable conditions for maximum efficiency so that the engine may be made to run at substantially the same efficiency for both light and heavy loads. Alternately the effective volume of the combustion space may be increased for a relatively smaller volume of charge admitted so that the effective compression will be lowered so as to enable the engine to run slowly and steadily under very heavy loads, thus substantially increasing its flexibility.

By advancing the piston 5 negatively in respect of the piston 4, the engine may be made so that it may be started and run in a reversed direction. This in effect is the same as advancing the piston 4 over the piston 5 and thereby produces the same relative positions of these pistons in a reverse direction, as formerly described, so that the conditions are suitable for the engine to be run in a reverse direction.

I claim:—

1. In an internal combustion engine, having one or more cylinder units, two pistons in each cylinder unit, a common combustion space for the two pistons, two separate cranks, one to each piston, a connection from each piston to its crank, positive gearing between the two cranks so that they will rotate at relatively different speeds, and means to enable one of the pistons to be advanced relatively to the other so as to vary the effective volume of the combustion space to suit different loads and conditions, either during the operative or inoperative periods of the engine.

2. In an internal combustion engine having one or more cylinder units, two pistons in each cylinder unit, a common combustion space for the two pistons, spaced cranks, one to each piston, a connection from each piston to its crank, positive gearing between the two cranks so that they will rotate at relatively different speeds, and means associated with such gearing to enable one of the pistons to be advanced relatively to the other so as to vary the effective volume of the combustion space to suit different loads and conditions.

3. In an internal combustion engine having at least one cylinder unit, two pistons in each cylinder unit, a common combustion space for the two pistons, two separate cranks, one to each piston; a connection from each piston to its crank; helical toothed gearing between the two cranks so arranged that they will rotate at relatively different speeds and means to slide a portion of the helical gearing in an axial direction to enable one of the pistons to be advanced relatively to the other so as to vary the effective volume of the combustion space to suit different loads and conditions.

4. In an internal combustion engine having at least one cylinder unit, two pistons and two crank shafts in each cylinder unit, a common combustion space for the two pistons, two separate cranks, one to each piston; a connection from each piston to its crank; helical tooth gears associated with each crank shaft; a lay shaft; helical tooth gears on this lay shaft gearing with the gears on the two cranks so arranged that they will rotate at relatively different speeds, and means to slide a portion of the helical gearing in an axial direction to enable one of the pistons to be advanced relatively to the other so as to vary the effective volume of the combustion space to suit different loads and conditions.

5. In an internal combustion engine having one or more cylinder units, two cylinders side by side in each cylinder unit, separate pistons in each cylinder, a pair of crank shafts to which pistons having a common combustion chamber are separately connected, positive gearing between these crank shafts so that one set of pistons makes four and the other set two strokes to each cycle of operations and means operable during the operative or inoperative period of the engine to vary the relative angular positions of the cranks carried by said crank shafts for the purposes specified.

6. In an internal combustion engine having one or more cylinder units, two cylinders side by side in each cylinder unit, separate pistons in each cylinder, separate crank shafts to which each of said pistons is connected; positive gearing between these crank shafts so arranged that one set of pistons makes four and the other set two strokes to each cycle of operations, a separate closed crank chamber in which each crank shaft is located, means to enable both crank chambers to induce and pre-compress a charge to be subsequently supplied to the cylinders, and means to vary the relative angular positions of the two crank shafts for the purposes specified.

7. In an internal combustion engine having one or more cylinder units, two cylinders side by side in each cylinder unit, separate pistons in each cylinder, separate crank shafts to which each of said pistons is connected; positive gearing between these crank shafts so arranged that one set of pistons makes four and the other set two strokes to each cycle of operations, a separate closed crank chamber in which each crank shaft is located, combined rotary inlet and transfer valves, ports on opposite sides of these valves, diagonal divisions between these ports across the valves, connections from the ends of the valves to a carburetter and transfer pipe respectively to enable both crank chambers to induce and pre-compress a charge to be subsequently supplied to the cylinders, and means to vary the relative angular positions of the two crank shafts for the purposes specified.

8. In an internal combustion engine having one or more cylinder units, two cylinders side by side in each cylinder unit, separate pistons in each cylinder, separate crank shafts connected individually to one piston of each cylinder unit, positive gearing between these crank shafts so arranged that one set of pistons makes four and the other set two strokes to each cycle of operations, a separate closed crank chamber in which each crank shaft is located, combined rotary inlet and transfer valves, inclined slots on opposite sides of these valves, diagonal divisions between these ports across the valves, means to slide the valves axially to vary the timing thereof, connections from the ends of the valves to a carburetter and transfer pipe respectively to enable both crank chambers to induce and pre-compress a charge to be subsequently supplied to the cylinders, and means to vary the relative angular positions of the two crank shafts for the purposes specified.

9. In an internal combustion engine having one or more cylinder units, two cylinders side by side in each cylinder unit, separate pistons in each cylinder, separate crank shafts connected individually to one piston of each cylinder unit, positive gearing between these crank shafts so arranged that one set of pistons makes four and the other set two strokes to each cycle of operations, a number of rows of exhaust ports in the two stroke cylinder adapted to be uncovered by its piston, a valve to cut off one or more of these rows of ports when desired, and means to vary the relative angular positions of the two crank shafts for the purposes specified.

10. In an internal combustion engine having one or more cylinder units, two cylinders side by side in each cylinder unit, separate pistons in each cylinder, separate crank shafts connected individually to one piston of each cylinder unit, positive gearing between these crank shafts so arranged that one set of pistons makes four and the other set two strokes to each cycle of operations; a separate closed crank chamber in which each crank shaft is located, means to enable both crank chambers to induce and pre-compress a charge to be subsequently supplied to the cylinders; a number of rows of exhaust ports in the two stroke cylinder adapted to be uncovered by its piston; a valve to cut off one or more of these rows of ports when desired, and means to vary the relative angular positions of the two crank shafts for the purposes specified.

11. In an internal combustion engine having one or more cylinder units, two cylinders side by side in each cylinder unit, separate pistons in each cylinder, separate crank shafts connected individually to one piston of each cylinder unit, positive gearing between these crank shafts so arranged that one set of pistons makes four and the other set two strokes to each cycle of operations; a separate closed crank chamber in which each crank shaft is located, combined rotary inlet and transfer valves, ports on opposite sides of these valves, diagonal divisions between these ports across the valves, connections from the ends of the valves to a carburetter and transfer pipe respectively to enable both crank chambers to induce and pre-compress a charge to be subsequently supplied to the cylinders; a number of rows of exhaust ports in the two stroke cylinder adapted to be uncovered by its piston; a valve to cut off one or more of these rows of ports when desired, and means to vary the relative angular positions of the two crank shafts for the purposes specified.

12. In an internal combustion engine having one or more cylinder units, two cylinders side by side in each cylinder unit, separate pistons in each cylinder, separate crank shafts connected individually to one piston of each cylinder unit, positive gearing between these crank shafts so arranged that one set of pistons makes four and the other set two strokes to each cycle of operations; a separate closed crank chamber in which each crank shaft is located, combined rotary inlet and transfer valves, inclined slots on opposite sides of these valves, diagonal divisions between these ports across the valves, means to slide the valves axially to vary the timing thereof, connections from the ends of the valves to a carburetter and transfer pipe respectively to enable both crank chambers to induce and pre-compress a charge to be subsequently supplied to the cylinders, a number of rows of exhaust ports in the two stroke cylinder adapted to be uncovered by its piston, a valve to cut off one or more of these rows of ports when desired, and means to vary the relative angular positions of the two crank shafts for the purposes specified.

13. In an internal combustion engine having one or more cylinder units, two cylinders side by side in each cylinder unit, separate pistons in each cylinder, separate crank shafts connected individually to one piston of each cylinder unit, helical tooth gearing between these crank shafts so arranged that one set of pistons makes four and the other set two strokes to each cycle of operations and means to slide a portion of the helical gearing in an axial direction to vary the relative positions of the two crank shafts for the purposes specified.

14. In an internal combustion engine having one or more cylinder units, two cylinders side by side in each cylinder unit, separate pistons in each cylinder, separate crank shafts connected individually to one piston of each cylinder unit, helical tooth gearing between these crank shafts so arranged that one set of pistons makes four and the other set two strokes to each cycle of operations, a separate closed crank chamber in which each crank shaft is located, means to enable both crank chambers to induce and pre-compress a charge to be subsequently supplied to the cylinders and means to slide a portion of the helical gearing in an axial direction to vary the relative angular positions of the two crank shafts for the purposes specified.

15. In an internal combustion engine, having one or more cylinder units, two cylinders side by side in each cylinder unit, separate pistons in each cylinder, separate crank shafts connected individually to one piston of each cylinder unit, helical tooth gearing between these crank shafts so arranged that one set of pistons makes four and the other set two strokes to each cycle of operations; a separate closed crank chamber in which each crank shaft is located; combined rotary inlet and transfer valves, ports on opposite sides of these valves; diagonal divisions between these ports across the valves, connections from the ends of the valves to a carburetter and transfer pipe respectively to enable both crank chambers to induce and pre-compress a charge to be subsequently supplied to the cylinders and means to slide a portion of the helical gearing in an axial direction to vary the relative angular positions of the two crank shafts for the purposes specified.

16. In an internal combustion engine having one or more cylinder units, two cylinders side by side in each cylinder unit, separate pistons in each cylinder, separate crank shafts connected individually to one piston of each cylinder unit, helical tooth gearing between these crank shafts so arranged that one set of pistons makes four and the other set two strokes to each cycle of operations; a separate closed crank chamber in which each crank shaft is located; combined rotary inlet and transfer valves, inclined slots on opposite sides of these valves; diagonal divisions between these ports across the valves; means to slide the valves axially to vary the timing thereof; connections from the ends of the valves to a carburetter and transfer pipe respectively to enable both crank chambers to induce and pre-compress a charge to be subsequently supplied to the cylinders and means to slide a portion of the helical gearing in an axial direction to vary the relative angular positions of the two crank shafts for the purposes specified.

17. In an internal combustion engine having one or more cylinder units, two cylinders side by side in each cylinder unit, separate pistons in each cylinder, separate crank shafts connected individually to one piston of each cylinder unit, helical tooth gearing between these crank shafts so arranged that one set of pistons makes four and the other set two strokes to each cycle of operations, a number of rows of exhaust ports in the two stroke cylinder adapted to be uncovered by its piston; a valve to cut off one or more of these rows of ports when desired and means to slide a portion of the helical gearing in an axial direction to vary the relative angular positions of the two crank shafts for the purposes specified.

18. In an internal combustion engine having one or more cylinder units, two cylinders side by side in each cylinder unit, separate pistons in each cylinder, separate crank shafts connected individually to one piston of each cylinder unit, helical tooth gearing between these crank shafts so arranged that one set of pistons makes four and the other set two strokes to each cycle of operations; a separate closed crank chamber in which each crank shaft is located, means to enable both crank chambers to induce and pre-compress a charge to be subsequently supplied to the cylinders; a number of rows of exhaust ports in the two stroke cylinder adapted to be uncovered by its piston; a valve to cut off one or more of these rows of ports when desired and means to slide a portion of the helical gearing in an axial direction to vary the relative angular positions of the two crank shafts for the purposes specified.

19. In an internal combustion engine having one or more cylinder units, two cylinders side by side in each cylinder unit, separate pistons in each cylinder, separate crank shafts connected individually to one piston of each cylinder unit, helical tooth gearing between these crank shafts so arranged that one set of pistons makes four and the other set two strokes to each cycle of operations; a separate closed crank chamber in which each crank shaft is located; combined rotary inlet and transfer valves; ports on opposite sides of these valves, diagonal divisions between these ports across the valves, connections from the ends of the valves to a carbureter and transfer pipe respectively to enable both crank chambers to induce and pre-compress a charge to be subsequently supplied to the cylinders; a number of rows of exhaust ports in the two stroke cylinder adapted to be uncovered by its piston; a valve to cut off one or more of these rows of ports when desired, and means to slide a portion of the helical gearing in an axial direction to vary the relative angular positions of the two crank shafts for the purposes specified.

20. In an internal combustion engine having one or more cylinder units, two cylinders side by side in each cylinder unit, separate pistons in each cylinder, separate crank shafts connected individually to one piston of each cylinder unit, helical tooth gearing between these crank shafts so arranged that one set of pistons makes four and the other set two strokes to each cycle of operations; a separate closed crank chamber in which each crank shaft is located; combined rotary inlet and transfer valves, inclined slots on opposite sides of these valves, diagonal divisions between these ports across the valve, means to slide the valves axially to vary the timing thereof, connections from the ends of the valves to a carburetter and transfer pipe respectively to enable both crank chambers to induce and pre-compress a charge to be subsequently supplied to the cylinders; a number of rows of exhaust ports in the two stroke cylinder adapted to be uncovered by its piston, a valve to cut off one or more of these rows of ports when desired and means to slide a portion of the helical gearing in an axial direction to vary the relative angular positions of the two crank shafts for the purposes specified.

ALBERT HOWELL SPROULE.